United States Patent
Chaiko et al.

[11] Patent Number: 6,153,103
[45] Date of Patent: Nov. 28, 2000

[54] METHOD FOR THE REMOVAL OF ULTRAFINE PARTICULATES FROM AN AQUEOUS SUSPENSION

[75] Inventors: David J. Chaiko, Naperville; John P. Kopasz, Bolingbrook, both of Ill.; Adam J. G. Ellison, Corning, N.Y.

[73] Assignee: The United States of America as represented by the United States Department of Energy, Washington, D.C.

[21] Appl. No.: 09/264,152

[22] Filed: Mar. 5, 1999

[51] Int. Cl.[7] .................................................. B01D 11/00
[52] U.S. Cl. ........................ 210/638; 210/639; 210/666; 210/774; 502/411; 588/11
[58] Field of Search ........................ 210/510.1, 500.25, 210/500.26, 638, 639, 643, 644, 650, 651, 660, 665, 666, 682, 702, 716, 751, 758, 767, 774, 806; 423/10; 588/2, 11, 12, 14, 20

[56] References Cited

U.S. PATENT DOCUMENTS

| | | | |
|---|---|---|---|
| 4,518,508 | 5/1985 | Conner | 210/751 |
| 4,695,511 | 9/1987 | Goodman et al. | 210/751 |
| 5,395,532 | 3/1995 | Chaiko | 210/638 |
| 5,494,863 | 2/1996 | Mathur | 588/11 |
| 5,948,726 | 9/1999 | Moskovitz et al. | 502/415 |

*Primary Examiner*—Joseph W. Drodge
*Attorney, Agent, or Firm*—Bradley W. Smith; Mark P. Dvorscak; William R. Moser

[57] ABSTRACT

A method of separating ultra-fine particulates from an aqueous suspension such as a process stream or a waste stream. The method involves the addition of alkali silicate and an organic gelling agent to a volume of liquid, from the respective process or waste stream, to form a gel. The gel then undergoes syneresis to remove water and soluble salts from the gel containing the particulates, thus, forming a silica monolith. The silica monolith is then sintered to form a hard, nonporous waste form.

12 Claims, 3 Drawing Sheets

MASS BALANCE OF SALT PARTITIONING FROM WASTE SIMULANT DURING THE SOL-GEL PROCESS FOR SOLID/LIQUID SEPARATION

| SPECIES | RECOVERED IN MOTHER LIQUOR, wt% | COMBINED RECOVERY FROM SYNERESIS AND GEL WASHING (pH 3), wt% |
|---|---|---|
| ACETATE | 88 | 100 |
| NITRATE | 66 | 100 |
| NITRITE | 94 | 100 |
| SULFATE | 46 | 92.6 |
| SODIUM | 59 | 97.4 |
| POTASSIUM | 47 | 98.8 |
| ALUMINUM | 0.71 | 40.5 |

FIG. 2

ELEMENTAL RELEASE FROM A MONOLITH SINTERED AT 1200°C AND
LEACHED IN DEIONIZED WATER AT 90°C FOR 30d

| ELEMENT | INITIAL CONCENTRATION IN MONOLITH, wt% | AMOUNT RELEASED DURING LEACHING, wt% |
|---------|----------------------------------------|--------------------------------------|
| Si | 24.92 | 0.0319 |
| Fe | 12.19 | BELOW DETECTION |
| Al | 4.36 | 0.0049 |
| K | 5.78 | 0.0278 |
| Na | 0.40 | 0.1040 |

METHOD FOR THE REMOVAL OF ULTRAFINE PARTICULATES FROM AN AQUEOUS SUSPENSION

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to an improved method for the removal of ultra-fine particulates from an aqueous suspension. This method can be used for the separation and recovery of particulates and colloids from high-ionic strength sludges and slurries. In addition, it can provide an alternative route for the production of a highly stable glass waste form.

The separation of fine particles from aqueous process streams remains one of the most difficult and expensive unit operations in the treatment of process streams, including highly radioactive wastes. The current baseline technology for the treatment of high level radioactive wastes includes the use of cross-flow nanofiltration to separate particulates and colloids from water and dissolved salts. It is very difficult to achieve the degree of particulate separation needed to produce a high-level waste concentrate and convert the bulk of the waste to a nontransuranic (non-TRU) Class A low-level waste. Membrane filtration processes are susceptible to fouling. To prevent membrane blockage, the filtration units must be regularly back flushed with cleaning solutions which become a secondary waste that must be treated and disposed of. In cross-flow filtration processes, final solids concentrations are generally limited to 15–20 wt % so that the slurry can be pumped through the membrane unit. The Theological properties of slurries containing high concentrations of salts, the tendency to form a gel, may put further limitations on the final solids concentrations achievable. Thus, large amounts of water and soluble salts remain in the concentrate after filtration.

In response to the problems associated with nanofiltration, this invention provides a method of using a sol-gel process for the removal of particulates in the treatment of processes or waste streams. Specifically, the sol-gel process is designed to separate and recover particulates, including submicron colloids, from caustic sludges and slurries at a level of efficiency sufficient to achieve non-TRU Class A low-level waste status for the bulk of the waste feed. In the alternative, the sol-gel process provides a convient route to the production of a highly stable ceramic waste form with high waste loading.

In general, the approach involves the addition of alkali silicate and an organic gelling agent directly to the caustic waste stream to immobilize particulates that range in size from macro sizes to nano-scale colloids. The particulates and colloids become immobilized within a porous, three-dimensional silica, $SiO_2$, network. Within minutes of formation, the water and soluble salts begin to spontaneously exude from the gel while the gel simultaneously contracts, syneresis. Quantitative recovery of particulates, including colloids, is achieved by physical entrapment within the $SiO_2$ network. Water soluble salts, originally present in the waste stream, are recovered in a separate aqueous stream. Salt recoveries from the monolith during syneresis can be in excess of 90%, and can be improved to greater than 99% by secondary washing, with a capability of recovering greater than 99.999% of all particulates, including colloids. The process is more efficient than membrane filtration and produces a rock-hard silica monolith that can be used as a feedstock to a glass melter or consolidated to near theoretical density by sintering. Because a dense waste form can be generated through a sintering process rather than through a glass melt, waste loading is not solubility limited and levels as high as 40 to 45 wt % are achievable.

It is the object of this invention to provide a method for separating ultra-fine particulates from aqueous suspensions using a sol-gel process.

It is a further object of this invention to teach the sintering of the porous gel to form a nonporous monolith by sintering at approximately 650° C.

It is another object of this invention to provide a method for improving the leach resistance of the monolith by first reducing its alkali content through a mild acid wash followed by sintering to a highly dense monolith by sintering at approximately 1200 to 1400° C.

Additional advantages, objects and novel features of the invention will become apparent to those skilled in the art upon examination of the following and by practice of the invention.

SUMMARY OF THE INVENTION

This invention is a method for the recovery of fine particles from an aqueous process or waste stream. The process includes adding an alkali silicate and organic gelling agent to the stream to form a gel with sufficient pore size and porosity to allow subsequent syneresis, a process which removes the water and soluble salts from the gel while retaining the particulates in the remaining silica monolith. The silica monolith, with retained particles, is sintered to form a nonporous ceramic waste form.

BRIEF DESCRIPTION OF THE DRAWINGS

The present invention is illustrated in the accompanying drawings where:

FIG. 2 illustrates a mass balance of salt partitioning from a waste stimulant during the sol-gel process for solid/liquid separation.

FIG. 3 illustrates a mass balance of metal ion partitioning during leach testing of a consolidated waste form.

DETAILED DESCRIPTION OF THE INVENTION

Figure 1:
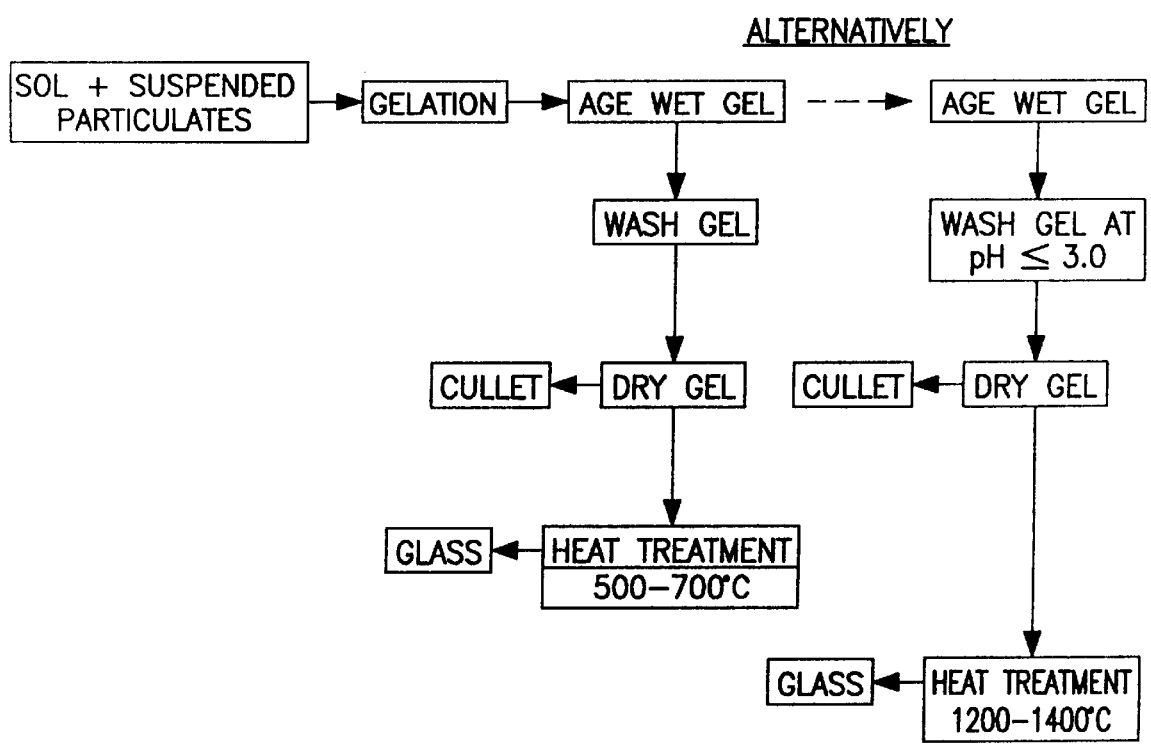
FIG. 1 is a schematic showing the process of particulate removal.

FIG. 1 depicts the general process for the removal of particulates from an aqueous process or waste stream which can include a radioactive waste stream.

The process is highly flexible and can be used to produce either a cullet that can be fed to a glass melter or, after a high-temperature treatment, a dense ceramic waste form. Initially, a gel is formed by the addition of an alkali silicate and an organic gelling agent directly to the process stream. Subsequent to the formation of the gel, a process called syneresis occurs in which the liquid held within the pores of the gel is spontaneously exuded. In essence, syneresis involves the separation of a liquid phase from the porous gel. The choice of gelling agent, the concentration of alkali silicate, the presence of water-soluble salts, the pH, and the temperature can significantly affect both the rate of syneresis and the volume of liquid recovered. Under alkaline conditions and with proper temperature control, enough soluble silica can be recovered in the mother liquor so that partial evaporation of the water will lead to spontaneous gelation. Thus, if the gel is aged at the proper temperature, a processing route is possible by which the secondary aqueous waste stream can be easily converted into a solid phase. If required, the porous gel can be converted to a nonporous monolith by sintering at approximately 650° C., thus trapping the particles in a nonporous medium. Salt recoveries from the monolith in excess of 90% and recoveries in excess of 99.999% of all particulates including colloids are achievable.

For high level tank waste (HLW) streams, the high pH (e.g., >12) and ionic strengths will cause immediate precipitation of sodium silicates, making it impossible to produce a gel. Implementation of the flowsheet in FIG. 1, therefore, requires the use of potassium silicate which resists flocculation when combined with HLW streams.

In designing a sol-gel process for solid/liquid separation, one must choose process conditions that maximize the rate and extent of syneresis. As the silica begins to gel, all of the particulates present in the slurry, including submicron colloids, become immobilized in a three dimensional $SiO_2$ network. During the wet processing stage, the gel contains a high degree of porosity (e.g. 50 to 70%) and a large average pore size (e.g., 100–400 nm) Since the pore size distribution is in the nanometer scale, complete recovery of micron-sized particulates is achieved. Nanoscale particles smaller than the pore size, act as nucleation sites for the deposition of silica, thereby providing a mechanism for the immobilization of colloids within the gel. A variety of gelling agents can be used: ethyl acetate, ethylene glycol acetate, ethylene glycol diacetate, diacetin, triacetin, and a variety of dibasic esters including dimethyl glutarate, diamethyl succinate, and dimethyl adipated. Both amide and ester-based gelling agents undergo either acid or base hydrolysis making them candidates for use in treating either acidic or basic waste streams. For safety reasons, flammable gelling agents with low flash points would not be considered good candidates for waste treatment processes; in addition, the production of ammonia during hydrolysis of the amides would require off-gas treatment.

It is widely recognized that the ester-based gelling agents can promote silica gel formation through pH modification. At high pH, the base hydrolysis of the esters and amides leads to a reduction in pH, which in turn, leads to a reduction in the silica solubility. Because of the extremely high pH of caustic high level nuclear wastes, silica gel formation is promoted by the appearance of acid salt due to ester hydrolysis rather than reduction in pH.

Laboratory testing using a neutralized current acid waste simulant spiked with a 5 wt. % of various micron-sized powders have shown that it is possible to form a silica monolith under highly caustic conditions. The simulant used in these tests contained a 4 M hydroxide. The amount of gelling agent added was not significant enough to significantly alter the pH of the solution.

In one set of preliminary tests, equal volumes of the waste simulant spiked with 5 wt % $Fe_2O_3$ particulates and a commercial potassium silicate, Kasil 6, were combined with a gelling agent, triacetin, an acetate ester. The mother liquor generated during syneresis was collected analyzed, and a mass balance on various ionic species was calculated. The results of the analysis for several of the salts originally present in the simulant and the acetate generated by the hydrolysis of triacetin are shown in FIG. 2. FIG. 2 depicts the wt. % of each species originally present in the simulant and recovered in the mother liquor. Results from the analysis of the mother liquor by filtration and examination of the filter surface by electron microscopy indicated complete recovery of the iron oxide solids within the silica monolith since no particles were found on the filter.

In general, increasing the temperature of the process increases the recovery of soluble salts during syneresis. Salt recovery can also be increased by washing the gel. When washed with deionized water overnight, salt recovery was increased by 100% for several anions (e.g., acetate, nitrate, and nitrite). Without affecting anion recovery, cation recovery can be dramatically increased during washing by reducing the pH of the wash water to about 3 or lower. The effect of a dilute acid wash on ion recovery is shown in FIG. 2. The partitioning of ions between the silica monolith and the mother liquor appears to correlate with the effect that the dissolved ions have on the water entropy. In other words, ions which lead to a decrease in water structure partition to the mother liquor in preference to those ions that lead to an increase in water structure. This partitioning apparently allows the system to reach a minimum free energy state by recovering some of the entropy lost during the sol-to-gel phase transition. On the other hand, the affinity of cations for the gel is primarily through ionic interaction with the silica surface. This interaction is strongest when the silica surface carries a net negative charge. This occurs at pH values above 2 to 3. Thus, washing the gel with dilute acid (e.g., pH less than or equal to 3) leads to a dramatic increase in cation recovery.

Reducing the alkali concentration of the silica monolith greatly increases corrosion resistance. It, also, increases the softening temperature since the matrix becomes essentially fused silica of great thermodynamic stability. Monoliths that are washed with dilute acid (e.g., pH about 3.0) do not begin to sinter until heated to a temperature of 1200° C., whereupon the porosity is reduced to less that 20%. The porosity can be reduced to theoretical density by heating to higher temperatures (e.g., 1400° C.). The corrosion behavior of a monolith containing 17.4 wt % $Fe_2O_3$ and which was sintered at 1200° C. was leached in deionized water at 90° C. for 30 d. The concentration of iron released into the leachate was below the detection limit of 10 ppb. The leach results for the other major constituents in the monolith are listed in FIG. 3. The corrosion rate of the monolith was well below that of conventional borosilicate glass waste forms.

Alternatively, if the alkali metal concentration of the gel is not reduced by acid washing, the monolith can be sintered at a temperature of 650° C. which results in the production of a glass-ceramic with very little permeability and near theoretical density. To increase the corrosion resistance, the monolith can be prepared by incorporating sufficient amounts of borate into the gel to produce a Pyrex® glass. This can be done by mixing a finely ground borate glass with the waste stream just before the addition of the alkaline silicate. The borate can be introduced as a glass prepared by heating boric acid to a temperature of about 180–200° C.

Although, the process has been described for a caustic process stream, i.e., pH>10, the same process can be applied to an acidic process stream by employing a lower alkaline silicate concentration.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A method to separate and recover particulates and colloids from an aqueous process stream or waste stream, comprising the steps of:

adding an alkali silicate and an organic gelling agent directly to a volume of liquid from the process stream or waste stream to form a gel monolith;

trapping particulates and colloids from the process or waste stream within a porous, three-dimensional silica network that comprises the gel monolith;

aging the gel monolith to allow syneresis to occur, a process whereby a liquid phase comprising a secondary waste stream, is separated from the gel monolith which simultaneously contracts;

drying the gel monolith to form a hard silica monolith;

processing the secondary waste stream;

recovering the silica monolith containing the trapped particulates and colloids.

2. The method of claim 1 whereby the silica monolith is sintered to approximately 650° C. to form a nonporous monolith.

3. The method of claim 1 whereby the silica monolith is used as a feedstock for a glass melter.

4. The method of claim 1 whereby the secondary waste stream is comprised of water and a quantity of soluble salts.

5. The method of claim 4 where the quantity of soluble salts recovered in the secondary stream is governed by controlling a temperature at which syneresis occurs.

6. The method of claim 1 whereby the gel monolith is washed after completion of syneresis.

7. The method of claim 6 wherein the gel monolith is washed with deionized water.

8. The method of claim 6 whereby the gel monolith is washed with a dilute acid.

9. The method of claim 8 wherein the dilute acid has a pH of less than or equal to 3.0.

10. The method of claim 8 wherein the silica monolith is sintered at a temperature of at least about 1200° C. reducing the porosity of the monolith to less than 20%.

11. The method of claim 10 wherein the silica monolith is sintered at a temperature of about 1400° C. to further reduce the porosity to theoretical density.

12. The method of claim 1 wherein the organic gelling agent is selected from the group consisting of ethyl acetate, ethylene glycol acetate, ethylene glycol diacetate, diacetin, triacetin, and dibasic esters.

* * * * *